United States Patent
Biddle et al.

(10) Patent No.: US 10,503,830 B2
(45) Date of Patent: Dec. 10, 2019

(54) NATURAL LANGUAGE PROCESSING WITH ADAPTABLE RULES BASED ON USER INPUTS

(71) Applicant: International Business Machines Corporation, Armonk, NY (US)

(72) Inventors: Edward J. Biddle, Hursley (GB); James S. Luke, Cowes (GB); James R. Magowan, Hursley (GB); Graham White, Winchester Hants (GB)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 14/135,119

(22) Filed: Dec. 19, 2013

(65) Prior Publication Data

US 2014/0180728 A1 Jun. 26, 2014

(30) Foreign Application Priority Data

Dec. 20, 2012 (GB) .................................. 1223022.3

(51) Int. Cl.
| | |
|---|---|
| G06F 17/00 | (2019.01) |
| G06N 5/02 | (2006.01) |
| G06F 17/27 | (2006.01) |
| G06F 16/332 | (2019.01) |

(52) U.S. Cl.
CPC ........ G06F 17/277 (2013.01); G06F 16/3329 (2019.01)

(58) Field of Classification Search
CPC ............................ G06F 17/277; G06F 16/3329
See application file for complete search history.

(56) References Cited

U.S. PATENT DOCUMENTS

| | | | |
|---|---|---|---|
| 7,962,326 B2 | 6/2011 | Tsourikov et al. | |
| 8,155,951 B2 | 4/2012 | Jamieson | |
| 8,165,987 B2 | 4/2012 | Luk | |
| 2002/0004790 A1* | 1/2002 | Yamanishi | G06F 17/2715 706/12 |

(Continued)

FOREIGN PATENT DOCUMENTS

EP 0175357 A2 3/1986

OTHER PUBLICATIONS

Marge et al. "Towards Overcoming Miscommunication in Situated Dialogue by Asking Questions", Building Representations of Common Ground with Intelligent Agents: Papers from the 2011 AAAI Fall Symposium, pp. 16-21.*

(Continued)

*Primary Examiner* — Austin Hicks
(74) *Attorney, Agent, or Firm* — Yee & Associates, P.C.

(57) ABSTRACT

Systems, methods and computer program products for processing natural language input are provided. Natural language input is processed by one or more processing rules. The processing rules may specify one or more actions to be performed. The processing rules may alternatively or additionally split up the natural language input into a plurality of simpler sub-inputs, each of which may then be processed by one or more processing rules. The processing rules themselves may be generalized, which generalization may be based on user input. In the event that a suitable processing rule cannot be found, a request may be made to a user to provide instructions for processing the natural language input.

10 Claims, 8 Drawing Sheets

(56) References Cited

U.S. PATENT DOCUMENTS

| | | |
|---|---|---|
| 2002/0013793 A1 | 1/2002 | Bergan et al. |
| 2005/0071150 A1 | 3/2005 | Nasypny |
| 2005/0155017 A1 | 7/2005 | Berstis et al. |
| 2006/0041935 A1* | 2/2006 | Conley ............... H04L 63/0227 726/11 |
| 2006/0184516 A1* | 8/2006 | Ellis .................. G06F 17/30722 |
| 2009/0070298 A1* | 3/2009 | Thione .............. G06F 17/30684 |
| 2010/0228538 A1* | 9/2010 | Yamada .................. G06F 17/27 704/9 |
| 2011/0004464 A1 | 1/2011 | Martino et al. |
| 2011/0125734 A1 | 5/2011 | Duboue et al. |
| 2012/0135389 A1 | 5/2012 | Desruisseaux |

OTHER PUBLICATIONS

Intellectual Property Office Search Report, dated Jun. 11, 2013, regarding Application No. GB1223022.3, 3 pages.

Kunze et al., "Putting People's Common Sense into Knowledge Bases of Household Robots," KI 2010: Advances in Artificial Intelligence, Lecture Notes in Computer Science vol. 6359, Sep. 2010, 8 pages.

Yao et al., "A Chinese Word Segmentation System for Information Processing of Complex Sentences," Journal of Chinese Language and Computing, vol. 17, No. 3, Jul. 2007, pp. 179-187.

\* cited by examiner

NATURAL LANGUAGE PROCESSING WITH ADAPTABLE RULES BASED ON USER INPUTS

This application claims the benefit of priority to United Kingdom Patent Application Serial No. GB1223022.3, filed on Dec. 20, 2013, the contents of which are hereby incorporated by reference.

FIELD OF THE INVENTION

The present invention generally relates to information retrieval systems, and more particularly, the invention relates to a novel method, system and computer program product for extracting facts and queries from natural language input.

BACKGROUND

Improvements in communications and storage technology over the last few decades have resulted in huge volumes of data being available in various electronic formats. For example, in 2012 one internet search engine estimated that there were billions of indexed web pages available on the internet totalling around 5 million terabytes of data. The true amount may be even greater than this, since some web pages are not indexed by any search engine.

The size of resources such as the internet makes it impossible for any meaningful searching to be carried out without the assistance of a computer. However, many resources like the internet have been set up to be easily intelligible by a human but not by a computer. The situation is thus that, given an initial question, a human can search and extract highly relevant information from a resource like the internet, but at a far too slow a rate to be of use, and a computer can rapidly extract large volumes of information from a resource like the internet but cannot easily determine the relevance of the information it has extracted in relation to the question.

As a result, humans have been required to pose a question, mentally deconstruct this question into pertinent keywords, use a computer to perform a search of a resource such as the internet based on those keywords, and then review the search results manually to extract the answer to their question.

However, this solution is not ideal. This is because people are used to posing questions in so-called 'natural language'. For example the simple question 'where did you go today?' is a natural language question that can easily be answered by a human, yet a computer may struggle to extract meaning from this question in order to provide an appropriate answer. Conversely, a question phrased in terms readily intelligible by a computer (often termed a 'query') is difficult for a human to understand, making it difficult for a human to pose such a query in the first place. Thus, search results using a basic 'keyword' method may be suboptimal.

In addition, many resources such as web pages, journal articles, textbooks, newspapers, magazines, patent specifications and blogs are written in natural language for human consumption. The amount of data in these resources is enormous, but they remain difficult for computers to make use of due to their being written in natural language.

The field of natural language processing (NLP) attempts to bridge the gap between human and machine by providing methods and algorithms that enable computers to derive meaning from a natural language question or statement, in order to translate a natural language 'question' into a 'query' that is suited for interrogating a fact database, or a natural language statement into a fact that is suited for storing in a fact database.

One application of NLP algorithms is in the field of Question Answering (QA). In a process that may be referred to as 'query mapping', a natural language question posed by a user can be translated by a NLP algorithm into a query that is understandable by a computer. The computer can then rapidly interrogate a fact database to gather information relevant to answering the user's question and then present this information to the user, typically sorted according to relevance, in order to answer their question.

Often, the translation of the natural language question into a query will result in a far more refined search of the fact database, such that the set of results returned may be more pertinent to the user's question. In some optimal cases, the query mapping process will result in a query that returns only a single, definitive answer from the fact database. The process of query mapping thus reduces the burden of work on the user, at least because they will not have to wade through large volumes of potentially irrelevant information in order to find an answer to their question.

Another application of NLP algorithms is in the field of fact extraction. Fact extraction is the process of transforming natural language statements into structured facts. A computer may parse a body of text, sometimes referred to as a 'corpus' or 'text corpus', and use NLP algorithms to extract facts from this corpus. The extracted facts may be stored in a fact database, which may then be interrogated to answer questions. NLP algorithms thus find application in both the extraction of facts from a corpus into a fact database and also the mapping of natural language questions into queries suitable for interrogating a fact database.

Current NLP algorithms suffer from the problem that, as natural language sentences or questions increase in complexity, there is a combinatorial increase in the number of mappings required to extract a fact from the statement, or extract a query from the question. This translates to an increase in the time taken for fact extraction or query mapping, such that the NLP algorithm may not be able to complete its task in a reasonable time frame, or in some cases may not be able to complete it at all. The NLP algorithm may be allocated additional computing resources to reduce the time taken, but this solution is clearly a stop-gap solution that fails with an arbitrarily complex sentence. In addition, in some circumstances available computing resources may be limited, such that it is not possible to increase the computing resources available to the NLP algorithm.

Thus, it is clear that a need exists for improved natural language processing systems and methods that can reliably extract facts and/or map queries from an arbitrarily complex natural language sentence or query in a time frame that is acceptable to a user without commandeering prohibitively large amounts of processing resources.

BRIEF SUMMARY OF THE INVENTION

Disclosed herein are systems, methods and computer program products that are capable of extracting facts and/or queries from an arbitrarily complex natural language sentence. The same systems, methods and computer program products are also capable of mapping an arbitrarily complex natural language question onto a query or set of queries suitable for interrogating a fact database. Furthermore, the same systems, methods and computer program products are also capable of extracting at least one fact from a natural language question.

More specifically, embodiments described herein enable the processing of natural language input via the generation of one or more user specified processing rules. The processing rules may map natural language input onto one or more actions that are to be performed by a data processing device. The processing rules may alternatively or additionally map complex natural language input onto one or more sub-elements of reduced complexity, which may be subsequently mapped onto one or more actions to be carried out by a data processing device.

From a first aspect, the present invention provides a computer implemented method for processing natural language input, comprising the steps of:

receiving natural language input;

determining whether or not a rule exists in a rules database for processing the natural language input and processing the input if said determination is positive;

requesting clarification data from a user if said determination is negative; and updating the rules database on the basis of the clarification data.

From a second aspect, the present invention provides a data processing device for processing natural language input, wherein the processing device is configured to:

receive a natural language input;

determine whether or not a rule exists in a rules database for processing the natural language input and process the input if said determination is positive;

request clarification data from a user if said determination is negative; and update the rules database on the basis of the clarification data.

From a third aspect, the present invention provides a system for processing natural language input, comprising:

a rules database for storing rules;

an input device for receiving a natural language input from a user; and the aforementioned data processing device.

From a fourth aspect, the present invention provides a computer program product for processing natural language input, the computer program product comprising: a computer readable storage medium readable by a processing circuit and storing instructions for execution by the processing circuit for performing the aforementioned method.

BRIEF DESCRIPTION OF THE DRAWINGS

Preferred embodiments of the present invention will now be described, by way of example only, with reference to the following drawings in which.

DETAILED DESCRIPTION OF THE EMBODIMENTS

Figure 1:
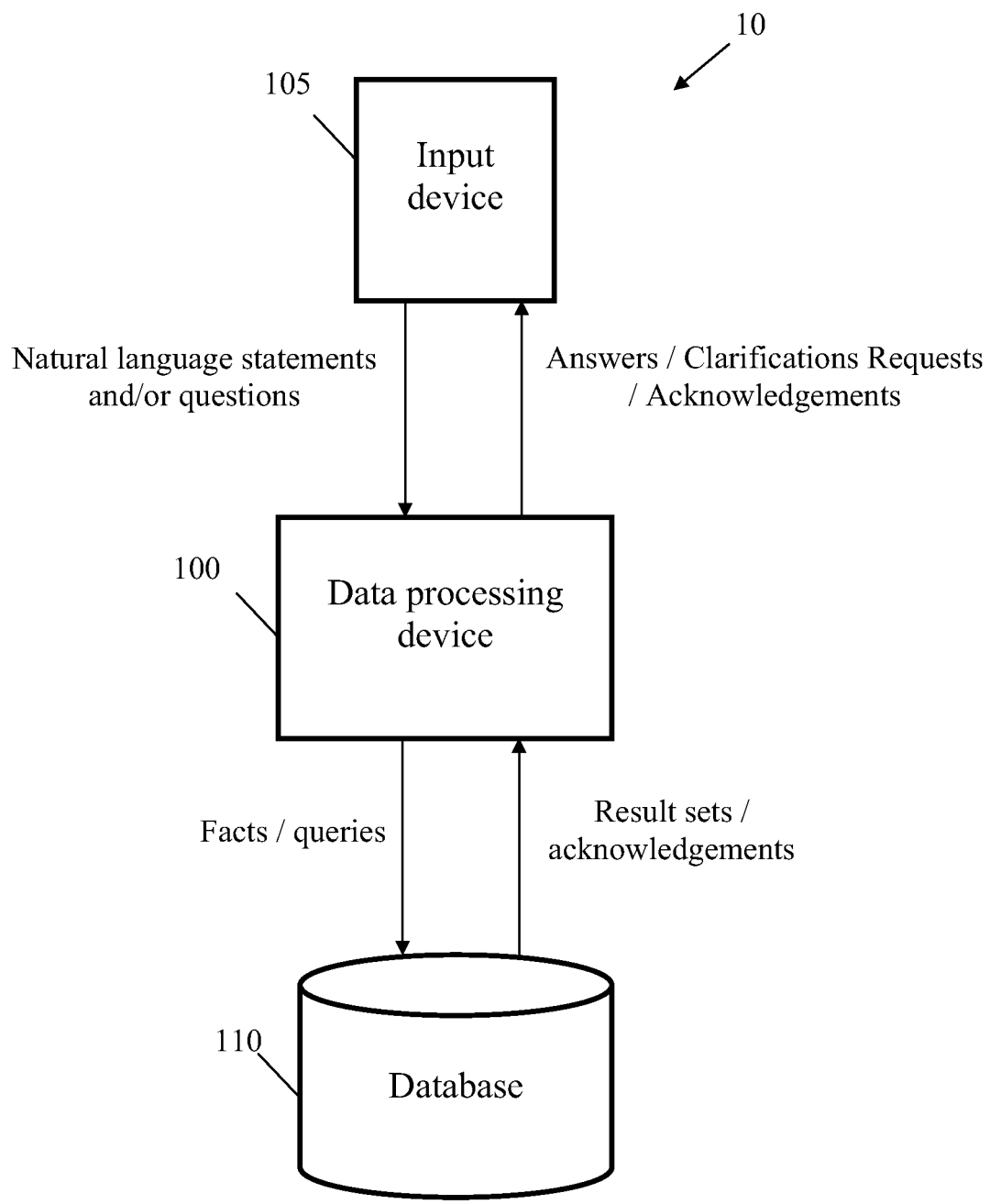
FIG. 1 is a schematic diagram of a system that may be used to carry out the processing of natural language input.

As will be appreciated by one skilled in the art, aspects of the present invention may be embodied as a system, method, computer program product or computer program. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of".

Referring now to the Figures, FIG. 1 shows a high level schematic diagram of a system 10 according to embodiments described herein that is suited for processing natural language input. System 10 includes a data processing device 100, an input means 105 and a fact database 110. Arrows in this figure are intended to indicate communicative couplings between elements, indicating that said elements can exchange data and/or instructions.

Data processing device 100 may be a localised data processing device such as a computer or a distributed data processing device comprising a plurality of localised data processing devices, such as a plurality of computers communicatively coupled in a local area network or wide area network. The network may include purely wired or purely wireless elements, or they may include a combination of wired and wireless elements.

Data processing device 100 is capable of processing data, including data comprising natural language elements. The natural language data may be provided to data processing device 100 in various forms and from various sources.

In some embodiments the natural language input is obtained directly from one or more users via an input device 105, which may include one or more human interface devices (not shown), such as a keyboard, mouse or microphone. In the case of a microphone, data processing device 100 and/or data input device 105 may include a transcription component (not shown) configured to automatically convert audio input such as speech into text. Input device 105 may also include a means for communicating with the user, such as a display device (not shown).

Input device 105 and/or data processing device 100 may also be configured to accept input in the form of instructions, which may or may not be in a natural language. The instructions may be provided by a user via input device 105, or they may be provided by another data processing device (not shown) communicatively coupled to input device 105 and/or data processing device 100. The instructions may include one or more reserved keywords.

Data processing device 100 may be configured to act in accordance with the instructions it receives. In some embodiments the instructions may cause data processing device 100 to obtain a body of data containing at least some natural language data, hereinafter referred to as a corpus, from one or more local and/or remote sources. The natural language data may include data from at least one of journal articles, textbooks, patent specifications, web pages, blogs, newspapers, electronic documents, magazines, e-books and the like. Data processing device 100 may be configured to identify items within a corpus containing at least some images and further may be configured to automatically convert said images into machine-encoded text via known optical character recognition (OCR) techniques. Data processing device 100 may alternatively or additionally be configured to identify a natural language of text within an item that is part of the corpus and employ known machine translation techniques, methods and/or algorithms to convert this natural language text into another, different natural language. The converted text may then also be stored in the corpus.

The input may comprise one or more natural language questions, one or more natural language statements, or a mixture of one or more natural language questions and one or more natural language statements. At least one of the natural language questions and/or natural language statements may be 'complex'.

As used herein, a complex natural language statement is a natural language statement that contains more than one fact. For example, the natural language statement:

Peter is an engineer conveys only one fact; that is, the fact the Peter is an engineer.

However, the natural language statement:

Peter (an American) is an engineer contains two facts, these being the fact that Peter is an American and also the fact that Peter works as an engineer. The latter statement, containing more than one fact, is thus a complex statement.

As used herein, the term 'fact' refers to a piece of information connected to a subject, where the information qualifies some aspect of the subject. Examples of a fact thus include objective statements such as 'the Statue of Liberty is 93 meters tall' and also subjective statements such as 'that film was good'. Therefore typically, but not exclusively, a fact will contain a subject and a qualifier.

Similarly, as used herein a complex natural language question is a natural language question that contains more than one aspect. For example, the natural language question:

What is the speed of sound?

contains only one aspect; that is, a question relating to the speed of sound.

However, the natural language question:

What is the speed of sound at Concorde's cruising altitude?

contains two aspects, these asking what the cruising altitude of Concorde is and what the speed of sound is at this altitude. The latter question, containing more than one aspect, is thus a complex question.

It will be appreciated that properties such as the grammatical structure, length or subject matter of a complex natural language statement or question may vary significantly from the illustrative examples given previously without departing from the scope of the present invention. In addition, it will be appreciated that a complex natural language statement or question may comprise a part of a natural language sentence, a whole natural language sentence, or a plurality of natural language sentences without departing from the scope of the present invention.

As shown in FIG. 1, data processing device 100 is communicatively coupled to a database 110. Database 110 may comprise at least one non-volatile storage device of the type known in the art such as a hard disk drive (HDD) or solid state drive (SSD). Database 110 may be local to data processing device 100 and may even be part of data processing device 100. Alternatively, database 110 may be located remotely from data processing device 100. Database 110 may comprise a number of distinct non-volatile storage devices that together form a distributed storage system.

Database 110 provides a repository for storing facts that are extracted from natural language statements. The extraction of facts may be performed by data processing device 100, or it may be performed by another entity. Database 110 may also store one or more processing rules for processing natural language input. These may be split into 'action rules' and 'abstraction rules'.

Action rules may define a set of actions for data processing device 100 to carry out, where these actions may be related to some natural language input. Abstraction rules may split up some complex natural language input into multiple sub-elements of reduced complexity. Further details on abstraction rules are provided later in this specification in connection with FIGS. 3 and 3a.

An action rule is a rule that defines a mapping between a natural language input and one or more actions or operations that may be carried out by data processing device 100. An action rule may take the form of an input pattern that is associated with one or more actions. An action rule may be encoded in any combination of a high level programming language using regular expressions, a product rule language such as Applicant's LanguageWare® NLP technology component, AeroText provided by Rocket Software or VisualText® provided by Text Analysis International, Inc, or in a controlled language such as controlled English.

Figure 2:
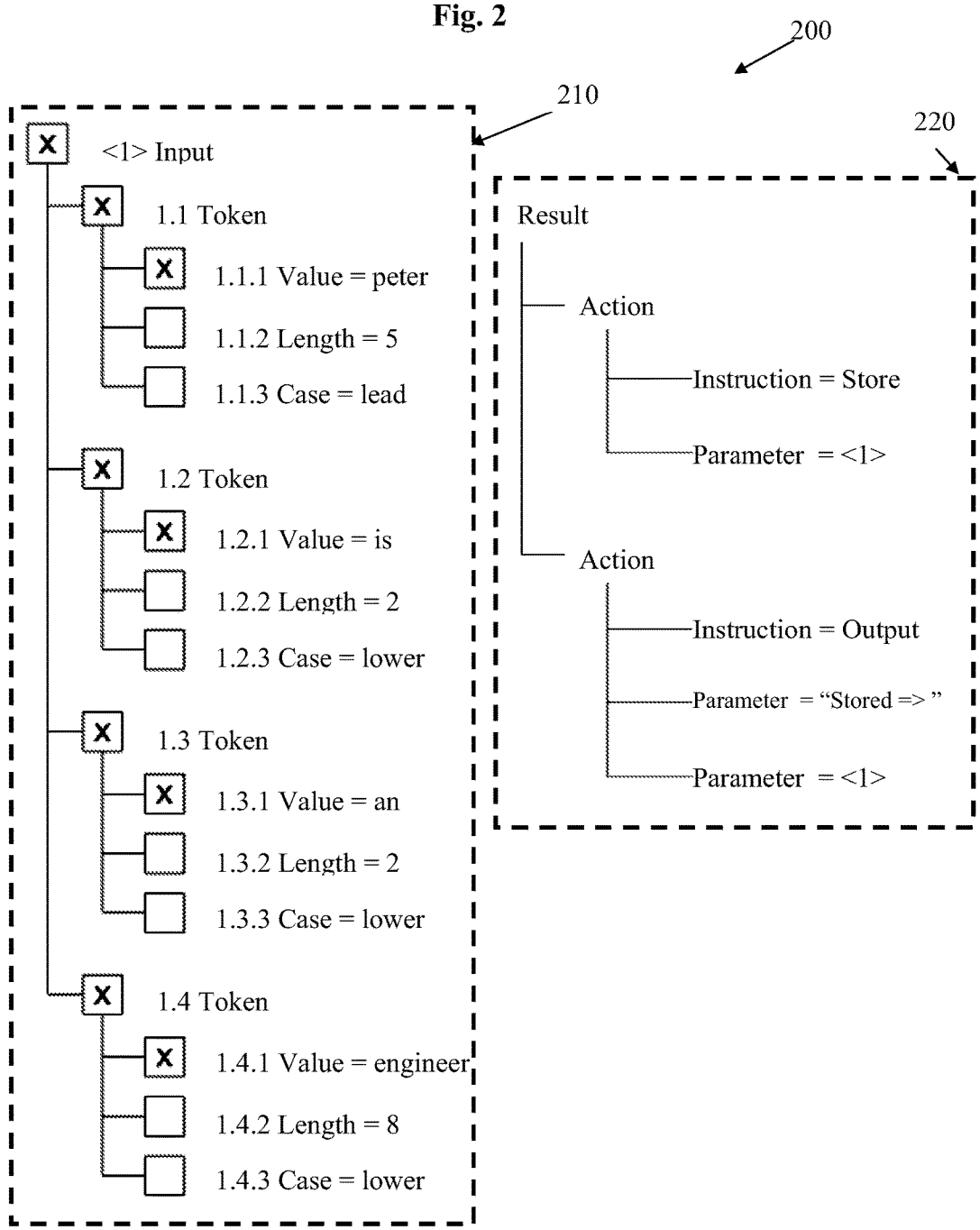
FIG. 2 is a schematic representation of an action rule that is suited for processing natural language input.

An action rule may be created based on a particular natural language input. An exemplary action rule 200 is shown in FIG. 2. Action rule 200 includes two components; an input pattern 210 and an associated action set 220. An action rule may be created via the process shown in FIG. 2a.

Figure 2A:
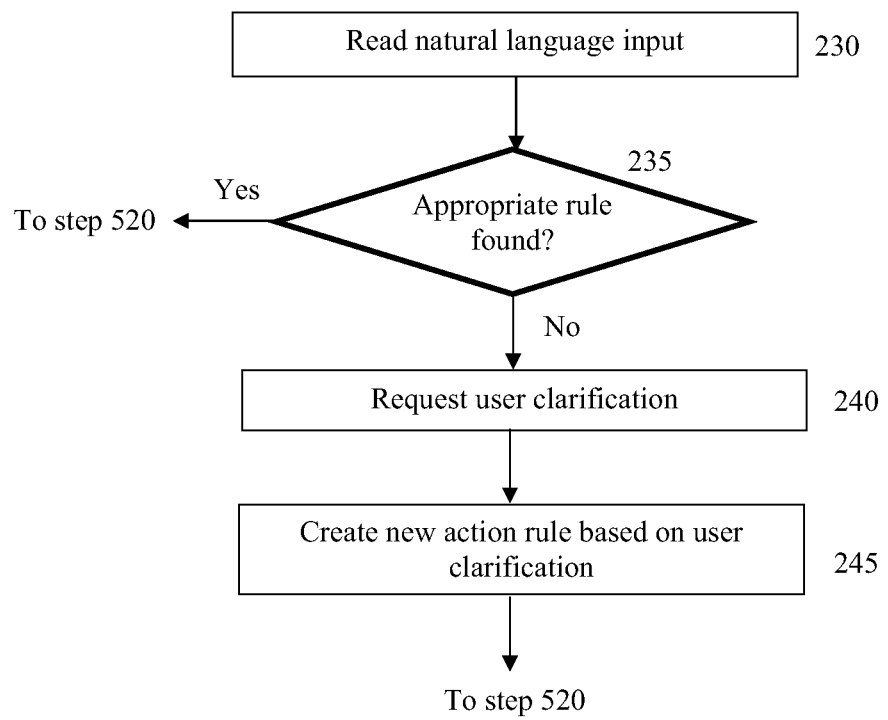
FIG. 2a is a flow diagram showing how the action rule of FIG. 2 may be created.

Referring now to FIG. 2a, in step 230 data processing device 100 reads some natural language input and in step 235 determines if an action rule appropriate to deal with this natural language input is available. This determination may involve a number of tests such as determining whether natural language input contains a) all of the tokens specified in the input pattern and b) whether the order of the tokens in natural language input <1> is the same as the order specified in the input pattern. The comparison may alternatively or additionally involve determining if a token in natural language input <1> is 'related' to a token in an input pattern. Examples of when a token may be considered to be related to another token include but are not limited to when both tokens are in the same semantic field, when one token is a synonym of the other, when one token is grammatically and/or semantically equivalent to another, when one token is a hypernym of the other and/or when one token in a hyponym of the other.

The tests may require the natural language input to be split up into multiple sub-elements. Each sub-element may be formed of one or more tokens of the original natural language input. Where a sub-element is formed of multiple tokens, the ordering of these may be different to the ordering of the same tokens in the original natural language input. In addition, or in the alternative, a sub-element may omit one or more tokens of the original natural language input. Multiple sub-elements corresponding to a single natural language input may share tokens of that piece of natural language input.

Figure 5:
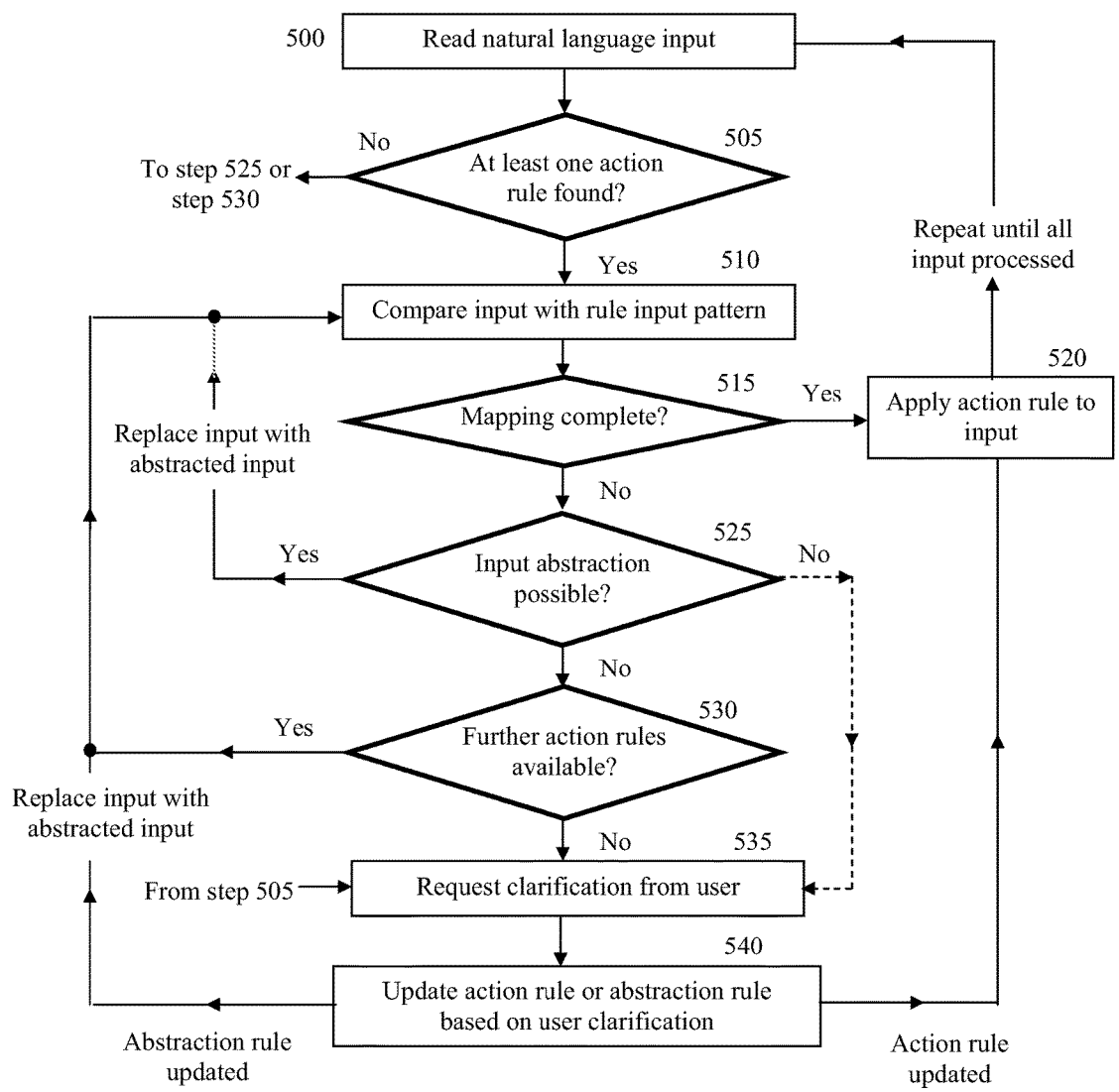
FIG. 5 is a flow diagram showing the operation of a data processing device according to embodiments described herein.

If an appropriate action rule is found, data processing device 100 proceeds to step 520 of FIG. 5 and applies the action rule to the input.

Figure 3:
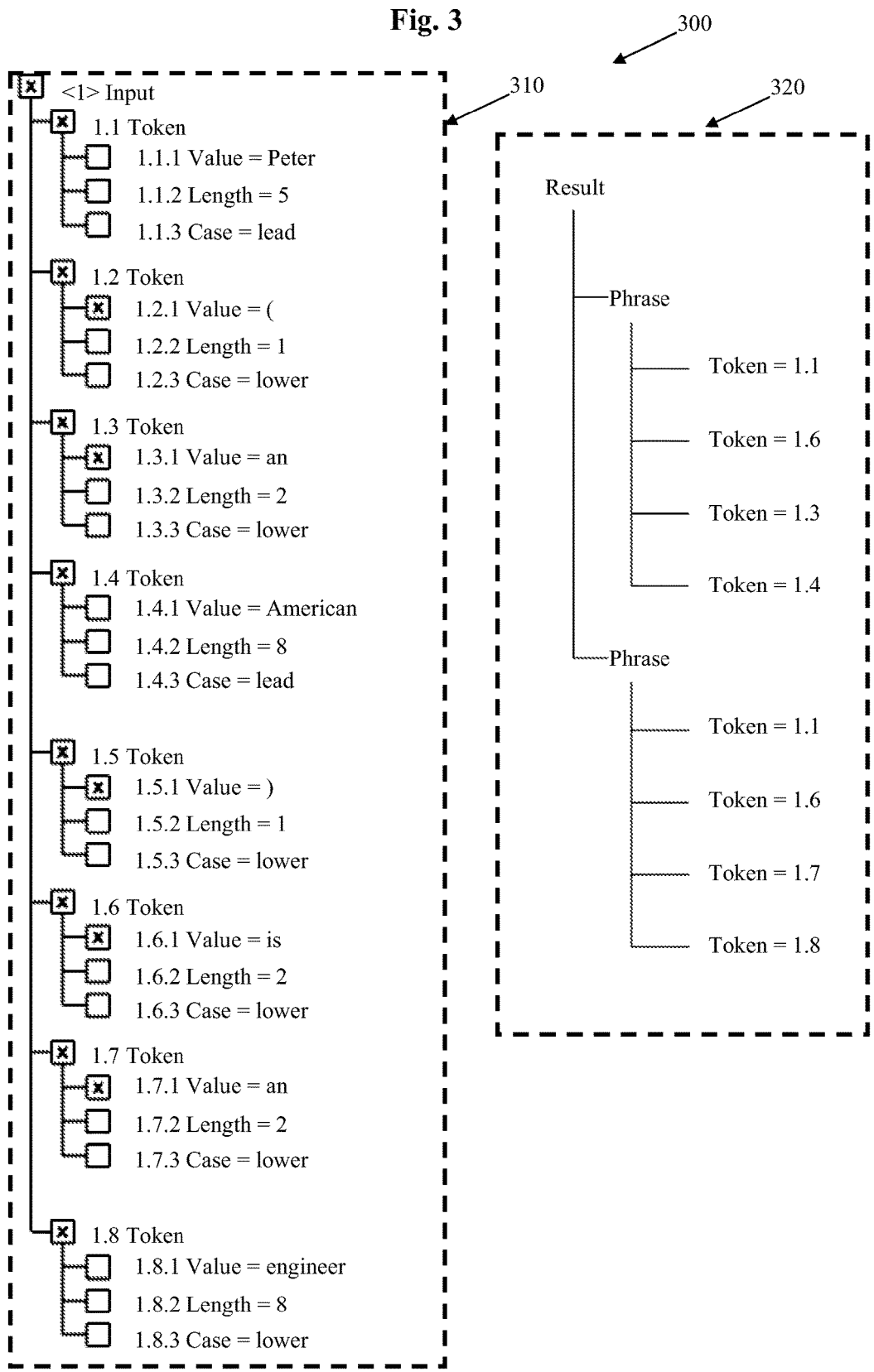
FIG. 3 is a schematic representation of an abstraction rule that is suited for abstracting complex natural language input.
Figure 3A:
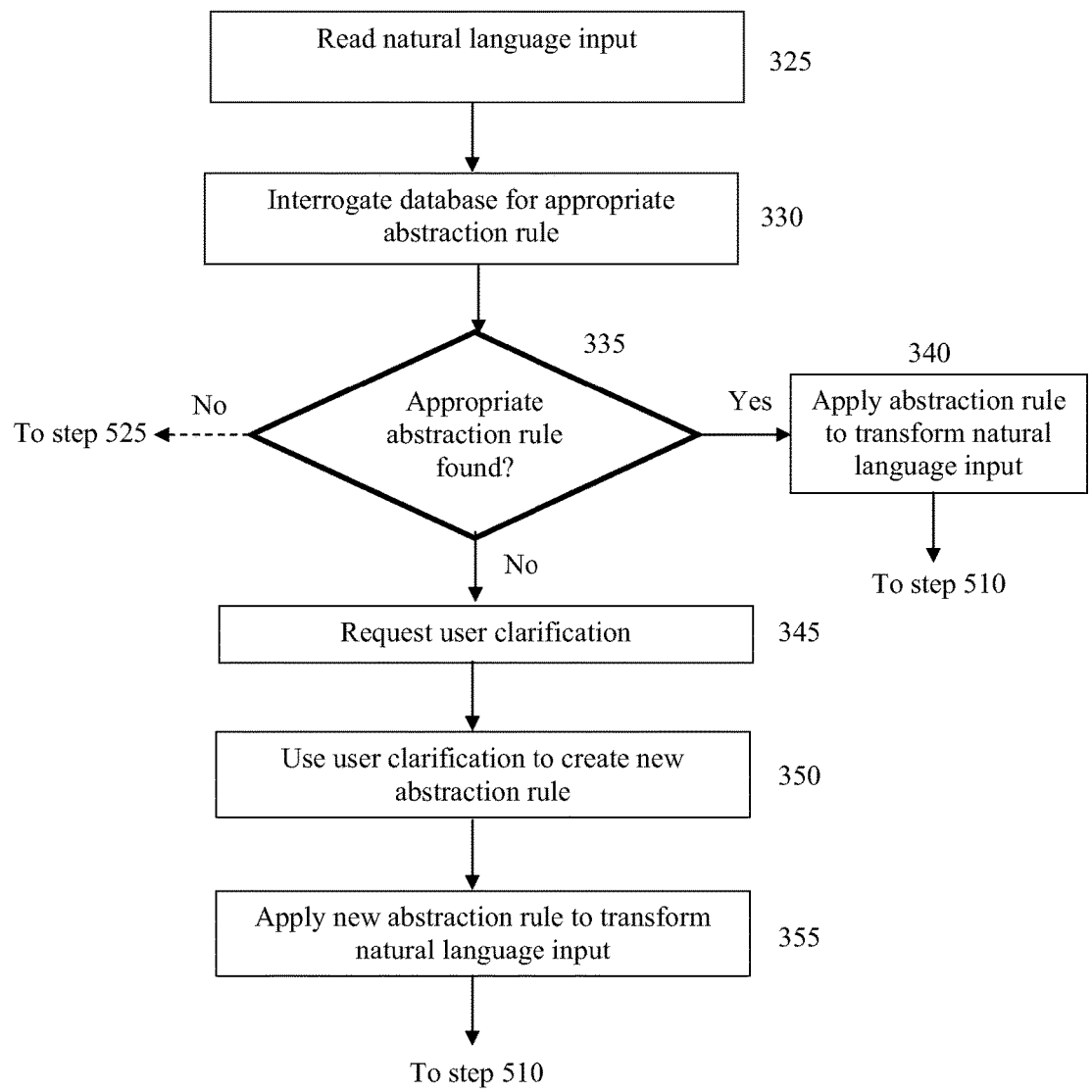
FIG. 3a is a flow diagram showing how the abstraction rule of FIG. 3 may be created.

If data processing device 100 does not find an appropriate rule then in step 240 data processing device 100 proceeds to request a clarification from a human user. In the exemplary embodiment of FIG. 2a it is assumed that abstraction of the natural language input, as described later in this specification primarily in connection with FIGS. 3 and 3a, is not possible in this case. However, it will be appreciated that the process of creating an action rule may include one or more natural language abstraction steps.

A request for user clarification may involve displaying a message to a user, where the message may include an indication of the nature of the clarification required by data processing device 100. The indication may include any combination of at least a portion of the natural language input that was read in step 230, where the portion may comprise at least a part of the natural language input. The indication may alternatively or additionally include a representation of an action rule and/or a representation of an abstraction rule already available to data processing device 100. The indication may alternatively or additionally include at least a portion of an abstraction of the natural language input that was read in step 230.

One example of a request for clarification is the phrase 'input '[natural language input]' was not understood', where [natural language input] corresponds to at least a portion of the natural language input that was read in step 230. Another example of a request for clarification is the phrase 'input '[natural language input]' could not be abstracted'.

A request for clarification may be presented to a user as a rules definition user interface. The rules definition user interface may enable the user to define a rule for processing some natural language input. The user may be able to define at least one action rule and/or at least one abstraction rule using the rules definition user interface.

In response to a request for clarification, a human user may provide data processing device 100 with information that allows it to create or update an action rule. This information may be provided via input device 105. The information provided by a user in response to the request for clarification may include an explanation of how to process at least a portion of the input read in step 230. The explanation may be provided by the user in a format that uses a series of reserved words, which data processing device 100 may be able to recognise and interpret without requiring input from a user.

Once the user has provided a clarification, data processing device 100 proceeds to step 245 and creates a new action rule. The input pattern and action set may be defined by at least one of the natural language input read in step 230 and the user clarification provided in step 240.

In order to create a new action rule, data processing device 100 may deconstruct the natural language input read in step 230 into a series of tokens. An example of this deconstruction is shown in FIG. 2 for the input <1>='Peter is an engineer'. The input is split up into tokens 1.1, 1.2, 1.3 and 1.4, where each token corresponding to an individual natural language word in this example. Each token has various properties 1.1.1, 1.1.2, 1.1.3 . . . 1.4.3 associated with it. These properties may be determined by data processing device 100 in a conventional manner.

As shown in FIG. 2, the properties may include the value 1.1.1 of each token, the length 1.1.2 of the each token (i.e. the number of characters it contains) and the 'case' 1.1.3 of each token. Here, case refers to the capitalisation status of the token. Token 1.1 ('Peter') begins with a capitalised character and so is given the case designation 'lead'; tokens 1.2, 1.3 and 1.4 contain no capitalised characters and so are given the case designation 'lower'. A token having at least one capitalised character that is not the first character of the token may be given the case designation 'mixed'. The skilled person will appreciate that recording such information can be useful when determining the grammatical relationship between words in a natural language sentence.

It will be appreciated that other definitions of a token, including but not limited to individual characters and a plurality of words, may also be used. In addition, other properties of each token not mentioned above or shown in FIG. 2 may alternatively or additionally be determined. Other properties include but are not limited to 'special character', which may determine whether the token contains or is a character other than a character forming part of an alphabet, 'punctuation' which may determine whether the token contains or is a punctuation character, 'number' which may determine whether the token contains or is a numeric character, and the like. In some embodiments the lemma of a token may be determined and this information may be stored as a property of the token.

An action rule may include an input pattern that is created based on at least a part of the deconstructed natural language input. An exemplary input pattern 210 that is based on natural input <1> is shown in FIG. 2. In this example, all four tokens 1.1 to 1.4 of the natural language input <1> have been captured as part of input pattern 210, in the order that they occur in natural language input <1>. However, it will be appreciated that any number of tokens from natural language input, including only a single token, may be captured as part of input pattern 210. In addition, or in the alternative, the ordering of the tokens in the input pattern may differ from the ordering of the tokens in the natural language input. Furthermore, a single token from the natural language input may feature multiple times in an input pattern, even if it does not feature multiple times in the natural language input.

At least some of the tokens in the input pattern are marked as 'active'. An active token is one that will be compared to at least one token of some natural language input when the action rule is applied. 'Inactive' tokens not flagged in this manner may be ignored when the action rule is invoked. In FIG. 2, active tokens are represented as being marked with a cross ('X') and inactive tokens are represented as a blank box. Thus, in FIG. 2, each of tokens 1.1 to 1.4 is an active token, so each of these tokens will be compared to some natural language input when action rule 200 is invoked.

In addition to specifying tokens as active or inactive, an input pattern may also specify one or more properties associated with each token as active or inactive. Data processing device 100 may base the determination of which tokens and/or properties of the input pattern should be specified as active or inactive based at least in part on the user clarification provided in step 250.

As before, in FIG. 2 an active property is represented with a cross ('X') and an inactive property is represented as a blank box. Thus, in FIG. 2, the 'Value' property of each of tokens 1.1 to 1.4 is active, so the 'Value' property of each of these tokens will be compared to some natural language input when action rule 200 is invoked.

The action set of an action rule may be created based on the user clarification data provided in step 240. In particular, the action(s) specified in the action rule may be based at least in part on the instruction(s) provided by the user in the clarification.

An action set may comprise at least one of instructions, parameters and actions, and may contain any number of each of these.

Instructions may instruct data processing device 100 to carry out a task, or to perform some operation. Examples include the 'store' and 'output' instructions shown in action set 220 of FIG. 2, but it will be clear to the skilled person having the benefit of this disclosure that other instructions, such as 'print', 'query', 'convert', 'sort', 'lookup', 'delete', 'copy', 'paste' etc. may also be included as part of an action rule. An action rule may include one or more instructions and the instructions may be implemented by data processing device 100 in a conventional manner.

Each instruction may have associated with it one or more parameters, such as the parameters shown in action set 220 in FIG. 2. The one or more parameters may specify at least one entity that the instruction is to use as input when performing the operation associated with instruction.

Examples of entities that are suitable parameters include any of the fundamental data types known in the art of programming such as strings, Boolean values, characters, integers, floating point numbers etc., as well as a pointer to a memory location in which an instance of one of these data types is stored.

Each parameter is assigned a value by data processing device 100 when action set 220 is processed. The value may comprise at least one token of the natural language input. The value may also or alternatively comprise a reference to at least one token of an input pattern associated with the action set.

In the example shown in FIG. 2, one of the parameters of action set 220 is assigned the value '<1>' of input pattern 210, which in that particular example is a reference to the entire natural language input (i.e. a complete phrase). Other parameters which specify a single word from the natural language input, a plurality of sequential or non-sequential words, a single character or a plurality of sequential or non-sequential characters may also be used.

One example of a user definition of an action rule that uses reserved words is:
IF "Peter is an engineer" THEN STORE <1> OUTPUT "Stored=>"<1>
This particular example of user input creates an action rule that is able to handle the natural language input "Peter is an engineer". Thus, this exemplary user input corresponds to the creation of action rule 200 of FIG. 2. Action rule 200 is suited for storing a natural language statement as a fact and reporting the storage of this fact to a user; that is, action rule 200 is suited for fact extraction.

Facts extracted via fact extraction may be stored as a structured facts. For example, the natural language input <2>="Jane was born on 2 Mar. 1974" may be processed by an action rule defined as:

```
IF "Jane was born on 2 March 1974" THEN
    STORE <2.1> AS NAME
    STORE <2.5> AS DAY
    STORE <2.6> AS MONTH
    STORE <2.7> as YEAR
    OUTPUT "Stored => " <2>
```

This particular example of user input creates an action rule that is able to extract and store the fact "Jane was born on 2 Mar. 1974" as a structured fact. In particular, the word 'Jane' is stored as a 'NAME' object, the number '2' is stored as a 'DAY' object etc. Storing a fact as a structured fact may assist in answering a range of natural language questions related to the question 'when was Jane born?', such as 'which month was Jane born in?', 'which year was Jane born in?' etc.

It will be appreciated by the skilled reader that many different formats for storing structured facts may be used, and that the present invention encompasses all of such formats. For example, an alternative action rule for storing a structured fact based on the natural language input <2>="Jane was born on 2 Mar. 1974" may be:

```
IF "Jane was born on 2 March 1974" THEN
    STORE <2.1> AS NAME
    STORE <2.5> AS DOB.DAY
    STORE <2.6> AS DOB.MONTH
    STORE <2.7> AS DOB.YEAR
    OUTPUT "Stored => " NAME, DOB
```

It will be appreciated that other reserved words, such as WHEN, SWITCH, CASE, DO, LOOP, FOR, AND, ELSE, OR, NULL, QUERY and the like may also be used by a user when responding to a request for clarification. Furthermore, it will be appreciated by a person skilled in the art having the benefit of this disclosure that many variations in the way and format in which a human user provides information to data processing device 100 are possible. The present invention encompasses all such variations and modifications.

In some cases the natural language input may be complex. According to embodiments described herein, complex natural language input may be abstracted into less complex natural language input which may be processed more easily and quickly by data processing device 100. One or more abstraction rules may facilitate this process.

A schematic diagram of an exemplary abstraction rule 300 is shown in FIG. 3. Abstraction rule 300 includes two components; an input pattern 310 and an associated action set 320. These components are similar to input pattern 210 and associated action set 220 of action rule 200 and so will not be described in further detail here.

An abstraction rule such as abstraction rule 300 is able to abstract (i.e. transform) a complex natural language input into a number of 'less complex' natural language sub-statements and/or sub-questions. A 'less-complex' sub-statement and/or sub-question is one that contains fewer facts (in the case of a sub-statement) or fewer aspects (in the case of a sub-question) than the original natural language input. An abstraction rule may transform a natural language statement into a plurality of sub-statements, a plurality of sub-questions or a mixture of at least one sub-statement and at least one sub-question. Similarly, an abstraction rule may transform a natural language question may result in a plurality of sub-statements, a plurality of sub-questions or a mixture of at least one sub-statement and at least one sub-question. A sub-question or sub-statement may itself be complex and may be further transformed into a plurality of sub-questions, a plurality of sub-statements or at least one sub-question and at least one sub-statement via the application of one or more abstraction rules. In some cases the same abstraction rule may be used multiple times on a single natural language input and the resulting sub-questions and/or sub-statements.

For example, the natural language input "Peter (an American) is an engineer" is a complex statement, as it contains a plurality of facts. An abstraction rule such as abstraction rule 300 is able to transform this complex statement into two less complex statements; these being "Peter is an American" and "Peter is an engineer". Both of these statements contain only a single fact, and so are less complex that the original natural language input statement.

As another example, the natural language input "what is the speed of sound at Concorde's cruising altitude?" is a complex question, as it contains a plurality of questions. An abstraction rule may be used to transform this question into two sub-questions of lower complexity, as "what is the speed of sound at <what altitude does Concorde cruise at >?"

FIG. 3a is a flowchart showing a process carried out by data processing device 100 in order to abstract complex natural language input into a series of less complex statements.

In step 325, data processing device 100 receives some natural language input, which may include one or more complex natural language statements and/or one or more complex natural language questions. In step 330 data processing device interrogates a database, such as database 110, to determine if it contains any abstraction rules that are appropriate for use with the natural language input that received in step 325.

If data processing device cannot find any abstraction rules in database 110, then in some embodiments, as shown by the dotted arrow in FIG. 3a, data processing device 100 proceeds to step 530 of FIG. 5 and searches for further action rules. In other embodiments, when no abstraction rules are found, data processing device 100 proceeds to step 345 to request clarification from a user, as described later.

If data processing device finds one or more abstraction rules in database 110 then it makes a determination as to whether any of these abstraction rules are appropriate for use on the natural language input that is being considered.

This determination may involve comparing the input pattern of at least one abstraction rule to the natural language input. The comparison may include comparing at least a portion of the input pattern associated with the at least one abstraction rule found in step 330 with at least a portion of the natural language input read in step 325. The comparison may involve a determination of whether each token defined in at least a portion of the input pattern is present in at least a portion of the natural language input, or it may involve determining whether at least some of the tokens defined in the input pattern are present in at least a portion of natural language input.

The comparison may involve a number of tests such as determining whether natural language input contains a) all of the tokens specified in the input pattern and b) whether the order of the tokens in natural language input <1> is the same as the order specified in the input pattern. The comparison may alternatively or additionally involve determining if a token in natural language input <1> is 'related' to a token in an input pattern. Examples of when a token may be considered to be related to another token include but are not limited to when both tokens are in the same semantic field, when one token is a synonym of the other, when one token is grammatically and/or semantically equivalent to another, when one token is a hypernym of the other and/or when one token in a hyponym of the other.

The tests may require the natural language input to be split up into multiple sub-elements. Each sub-element may be formed of one or more tokens of the original natural language input. Where a sub-element is formed of multiple tokens, the ordering of these may be different to the ordering of the same tokens in the original natural language input. In addition, or in the alternative, a sub-element may omit one or more tokens of the original natural language input. Multiple sub-elements corresponding to a single natural language input may share tokens of that piece of natural language input.

For example, the phrase "Peter (an American) is an engineer" may be abstracted into two sub-elements, these being "Peter is an American" and "Peter is an engineer". The sub-elements in this example share the tokens 'Peter', 'is' and 'an', omit the tokens '('and')' and have shared the remaining tokens 'American' and 'engineer' between them.

The selection of an appropriate abstraction rule may include a comparison of the relative complexity of the abstraction rule(s) available to data processing device 100. In some embodiments the most complex abstraction rule may be chosen. The complexity of an abstraction rule may be defined by the number of tests it has to perform. In some embodiments a weighting may be applied to at least one test of the rule.

For example, the following exemplary abstraction rule A has a complexity of '3':
Abstraction Rule A:
a MaleName followed by a Noun where the Noun is Capitalised
The complexity of exemplary abstraction rule A is 3, because it includes three tests; these being the test for whether the natural language input includes a MaleName, whether the natural language input includes a Noun, and a test for whether the Noun is capitalised.

However, exemplary abstraction rule B has a complexity of '5':
Abstraction Rule B:
a MaleName where the Value is "John" followed by a Capitalised Noun where the Value is "Smiths"
The complexity of exemplary abstraction rule B is 5, because it includes five tests; these being the test for whether the natural language input includes a MaleName, whether the MaleName has the value "John", whether the natural language input includes a Noun, a test for whether the Noun is capitalised and a test for whether the Noun has the Value "Smiths".

In some embodiments exemplary abstraction rule B would be chosen in preference of exemplary abstraction rule A in step 335 of FIG. 3a, because the latter has a greater complexity.

An abstraction rule having a greater complexity will, in general, be more specific than an abstraction rule having a lower complexity. Thus, an advantage of choosing to apply a more complex abstraction rule in favour of a less complex abstraction rule is that the more complex abstraction rule may better apply to the natural language input in question. In particular, this procedure allows specific exceptions to general abstraction rules to be detected and processed, where otherwise they may be missed.

Returning to exemplary abstraction rules A and B, rule A encodes the general principle of male name recognition, and rule B encodes the specific exception that the input John Smiths is not a male name but is instead the name of a beverage. By preferentially choosing rule B, the exceptional case is tested for first and so data processing device 100 avoids reaching the incorrect conclusion that John Smiths is always a male name.

Returning to FIG. 3a, if data processing device 100 finds an appropriate abstraction rule in step 335 then it proceeds to step 340 and applies this rule to the natural language input in order to transform it into a plurality of sub-questions and/or sub-statements. Data processing device 100 may then proceed to step 510 of FIG. 5.

If data processing device 100 cannot find an appropriate abstraction rule, then it proceeds to step 345 and requests user clarification.

The user clarification process may include presenting an abstraction rule definition user interface to a human user. This interface may allow the user to define an abstraction rule for processing the natural language input. The definition may be provided by the user in a format that uses a series of reserved words, which data processing device 100 may be able to recognise and interpret without requiring input from a user.

One example of a definition using a series of reserved words is:

```
IF "Peter (an American) is an engineer" THEN STORE <1.1>
<1.6> <1.3> <1.4> AND <1.1> <1.6> <1.7> <1.8>
OUTPUT "Stored => " <1.1> <1.6> <1.3> <1.4> AND <1.1>
<1.6> <1.7> <1.8>
```

This particular example of user input creates an abstraction rule that is able to handle the natural language input "Peter (an American) is an engineer". Thus, this exemplary user input corresponds to the creation of abstraction rule 300 of FIG. 3.

In some embodiments, the definition provided by user may include a definition of a relationship between at least two elements of the natural language input. An example of where this may be the case is the complex natural language statement "Joe was born on the same day as Jane". This statement may be abstracted into the sub-statement 'Joe was born on <DATE>' and the sub-question 'when was Jane born?' The user may define an abstraction rule using reserved keywords such as:

```
IF "Joe was born on the same day as Jane" THEN
   <DATE> = QUERY ("When was Jane born?")
IF <DATE> != NULL THEN
   STORE "Joe was born on <DATE>"
   OUTPUT "Stored => Joe was born on " <DATE>
ELSE
   OUTPUT "No data stored"
```

In this example, the abstraction rule maps the natural language statement onto the sub-statement 'Joe was born on <DATE>' and the sub-question '<DATE>='when was Jane born?' Data processing device 100 is then able to subsequently process the question 'when was Jane born?' according to an appropriate previously defined action rule in order to extract the fact 'Joe was born on <DATE>' from the natural language input.

In step 350, data processing device 100 creates a new abstraction rule based at least in part of the user clarification. The new abstraction rule may be stored in database 110. The new abstraction rule may then be applied in step 355 to the natural language input read in step 325 to transform this input into one or more less complex sub-statements and/or one or more sub-questions. These sub-statements and/or sub-questions may be subsequently processed via one more action rules, as described in more detail later in connection with FIG. 5.

It will be appreciated that the creation and use of abstraction rules is a powerful technique for handling complex natural language input. Accordingly, embodiments described herein are able to more effectively process complex natural language statements.

In order to further improve the processing of natural language input, data processing device 100 may optionally be configured to generalize one or more existing action rules and/or one or more existing abstraction rules. A generalized action rule may map a class of natural language statements onto facts and/or queries and a generalized abstraction rule may abstract a class of complex natural language sentences.

Figure 4:
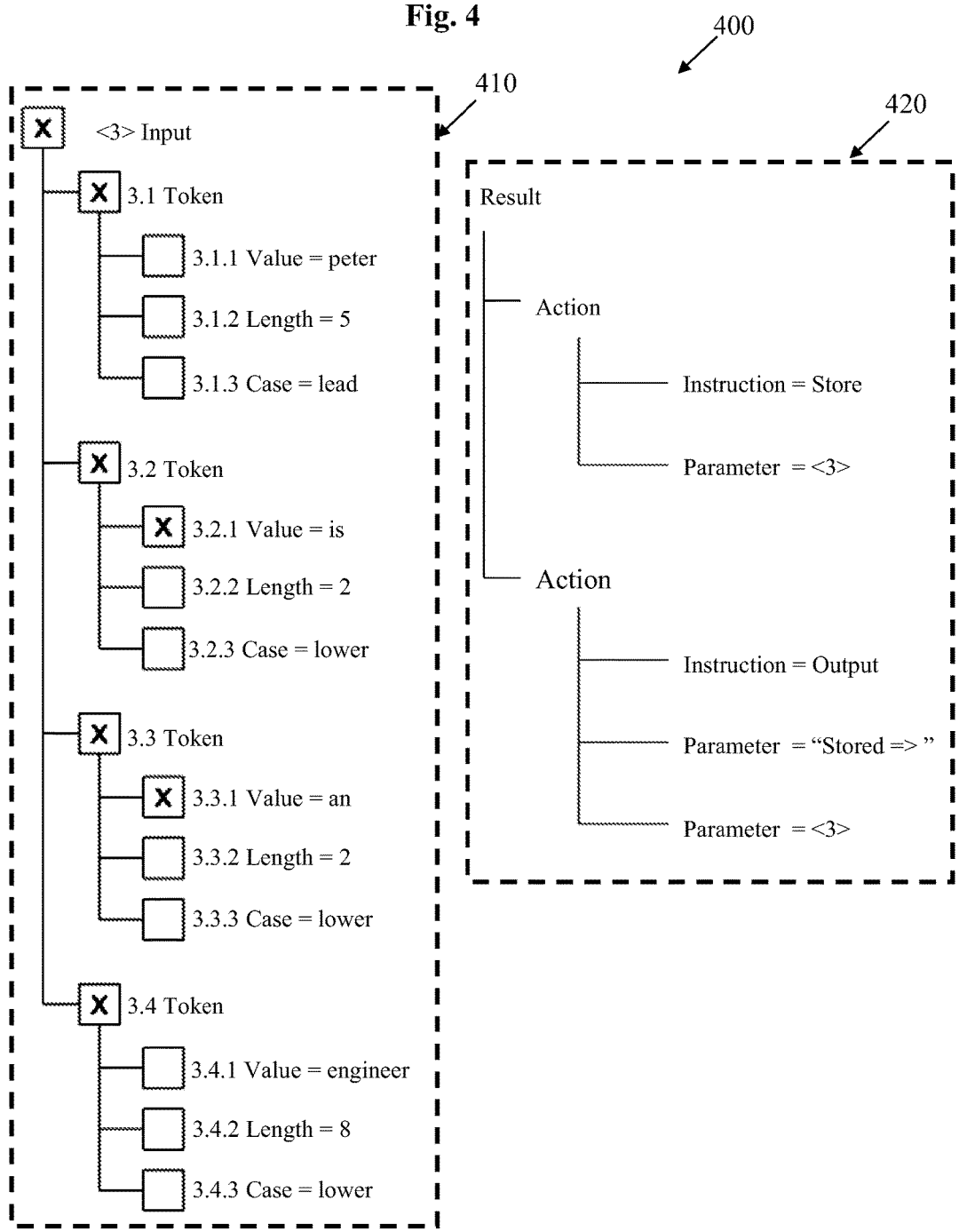
FIG. 4 is a schematic representation of a generalized action rule that is suited for processing natural language input.

An example of a generalized action rule is generalized action rule 400 that is shown in FIG. 4. Generalized action rule 400 includes two components; an input pattern 410 and an associated action set 420. These components are similar to input pattern 210 and associated action set 220 of action rule 200 and so will not be described in further detail here.

Generalized action rule 400 is a generalization of action rule 200 shown in FIG. 2. In particular, in this example, generalized action rule 400 has been generalized by making the value of tokens 1.1 and 1.4 inactive.

The effect of this is as follows. Consider the natural language input <3>="Sarah is a teacher". Action rule 200, which tests for a match between the value of all four tokens of the input, cannot handle this natural language input. However, generalized action rule 400, which only tests for a match for the values of tokens 3.2 and 3.3, can handle this natural language input. In this example, a 'match' for token 3.3 includes grammatical equivalence, and is not limited to matching identical words, so that generalized action rule 400 makes use of the equivalence of the words 'a' and 'an' in natural English to provide a true generalization of rule 200. In some embodiments this includes testing for a match between the lemma of two natural language words rather than the natural language words themselves. The lemma of each word may be stored as a property 'Lemma', similar to the properties 'Value', 'Length' and 'Case' shown in FIG. 2.

Generalized action rule 400 is thus able to process any natural language input of the form 'X is a Y' and 'X is an Y', where X and Y are any natural language words. It will therefore be appreciated that generalized action rule 400 is significantly more powerful than action rule 200.

Figure 4A:
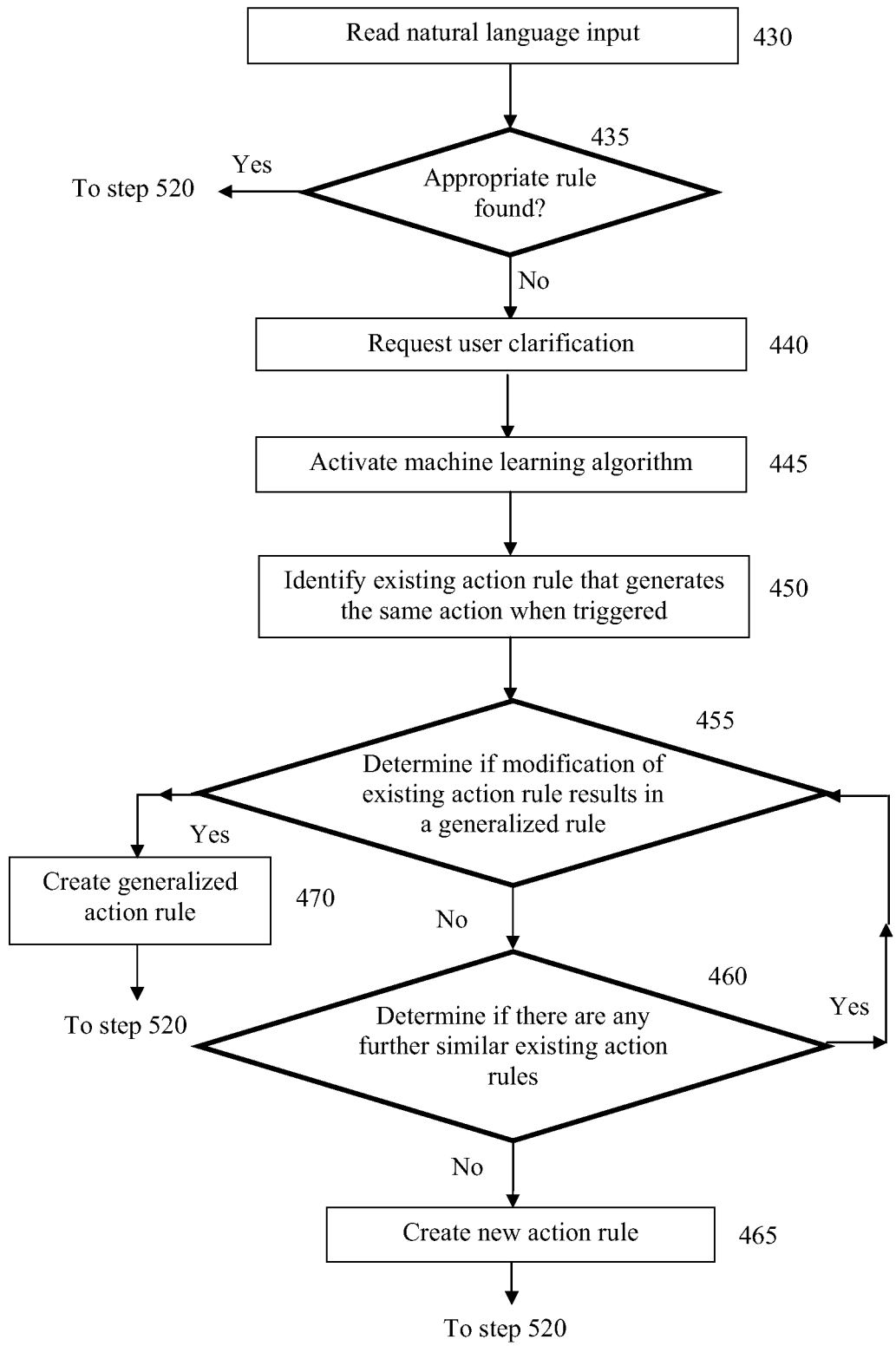
FIG. 4a is a flow diagram showing how an action rule may be generalized.

The process by which an action rule such as action rule 200 may be generalized to a generalized action rule such as generalized action rule 400 is shown in the flowchart of FIG. 4a.

In step 430, data processing device 100 reads some natural language input, which in this example is the input <3>="Sarah is a teacher". In step 435, data processing device 100 determines if an action rule appropriate to deal with this natural language input is available. If one is found, data processing device 100 proceeds to step 520 of FIG. 5 and applies the action rule to the input.

If data processing device 100 does not find an appropriate rule, then in step 440 data processing device 100 proceeds to request a clarification from a human user. In the exemplary embodiment of FIG. 4a it is assumed that abstraction of the natural language input, as described later in this specification primarily in connection with FIGS. 3 and 3a, is not possible in this case. However, it will be appreciated that the process of creating a generalized action rule may include one or more natural language abstraction steps and further that a generalized action rule may be created on the basis of natural language input that has already been abstracted at least once.

In step 440, data processing device 100 receives clarification from a human user in the manner described earlier in connection with FIG. 2a. In this case one suitable clarification is:

IF "Sarah is a teacher" THEN STORE <3> OUTPUT "Stored=>"<3>

Data processing device 100 activates a machine learning algorithm in step 445 that examines any existing action rules to determine if, based on the user clarification, a new action rule is needed to handle the natural language input read in step 430 or if an existing action rule can be generalized to handle this input.

In step 450, the machine learning algorithm identifies an existing action rule (a 'similar rule') that generates the same action(s) when triggered as specified in the clarification that was received in step 445. The identification may include comparing the action set of at least one action rule with the action set of at least one other action rule and/or the action set associated with the user clarification of step 445.

In step 455, the machine learning algorithms determines if modification of the similar action rule identified in step 450 results in a generalized rule. This determination may be achieved by modifying a part of the input pattern associated with the similar action rule and determining if the resulting modified rule is triggered by the input read in step 430. The modification may include removing at least one test from the similar action rule to reduce the total number of tests it carries out. In exemplary generalized action rule 400, the removal of the test for a match of the value of token 3.1 is an example of such a modification. Modifications may be applied sequentially, so determination step 455 may involve several iterations of successive removals of a single test condition. In some embodiments a list of existing natural language input that have triggered one or more existing action rules is maintained, and the determination step includes testing a modified rule against the entries on this list to ensure that it does not trigger for cases already covered by other rules.

If the result of determination step 455 is negative, then in step 460 data processing device 100 determines if there are any further similar existing action rules that have not been tested. If it determines that there are, it repeats step 455 using these further rules. If it determines that all similar existing action rules have been tested, then in step 465 data processing device 100 creates a new action rule based on the user clarification provided as a result of step 440. The creation of the new action rule is performed in the manner described earlier in this specification.

If the result of determination step 455 is positive, then in step 470 data processing device creates a new generalized action rule. In some embodiments a new generalized action rule may be created by saving the modification(s) made during determination step 455 to the similar action rule on which the generalized action rule is based. In other embodiments a new action rule is created in the manner described earlier, where the input pattern of this new action rule is defined by the modification(s) made during determination step 455. Once the new generalized action rule is saved, the original action rule upon which it is based may be deleted or marked as obsolete. Data processing device 100 then proceeds to step 520 of FIG. 5 to apply the new action rule or generalized action rule to the natural language input.

It will be appreciated that an abstraction rule may also be generalized by the process according to FIG. 4a by changing step 435 such that data processing device 100 determines if an abstraction rule appropriate to deal with this natural language input is available. Step 450 would then identify an existing abstraction rule for processing by a machine learning algorithm in step 455, with the resulting output being a generalized abstraction rule (step 520) or a new abstraction rule (step 465).

It will also be appreciated that data processing device 100 may successively or concurrently use one or more of the aforementioned action rules, abstraction rules and/or generalized action rules and/or generalized abstraction rules in order to fully process natural language input. This is described more fully in the following passages with reference to FIG. 5.

FIG. 5 is a flowchart showing the operation of data processing device 100 when it is receives the natural language input <1>, "Peter is an engineer" according to embodiments incorporating various embodiments described earlier.

In step 500, data processing device 100 reads some natural language input, such as natural language input <1>, and in step 505 data processing device 100 interrogates database 110 to determine if it contains any action rules. Database 110 may be pre-provided with one or more action rules, or it may initially contain no action rules. If no action rules are found, in some embodiments data processing device skips to step 530 and requests user clarification in the manner described earlier. In other embodiments, data processing device skips to step 525 and determines if it is possible to abstract the natural language input read in step 500.

If in step 505, data processing device 100 determines that database 110 contains at least one action rule then it proceeds to step 510. In step 510 data processing device 100 compares at least a portion of the input pattern associated with one of the action rules found in step 505 with at least a portion of natural language input <1> to determine if it is appropriate for processing the natural language input read in step 500. The comparison may be carried out in the manner described earlier in this specification.

In some embodiments, the comparison performed in step 510 is carried out on abstracted natural language input, such as may be produced by data processing device 100 after carrying out natural language abstraction process described earlier in connection with FIGS. 3 and 3a. When the comparison of step 510 is performed on abstracted natural language input, data processing device 100 may treat the sub-elements of the abstracted natural language input as multiple independent pieces of natural language input. Accordingly, comparison step 510 may be performed on each sub-element as a separate entity.

In step 515, data processing device 100 determines whether the result of the comparison of step 510 indicates that the input pattern of the action rule could be completely mapped onto natural language input <1> or a sub-element. A complete mapping may be defined as the case where all tokens of the natural language input or sub-element can be mapped onto at least one token of the input pattern.

In the case that the mapping is determined to be complete, data processing device 100 proceeds to step 520 and applies the action rule considered in step 510 to the natural language input or sub-element of natural language input. This may cause data processing device 100 to carry out the instruction(s) contained in the action rule in question, or it may cause data processing device 100 to instruct an Interpreter to execute the instructions contained in the action rule. The result of applying the action rule may include but is not limited to identifying and/or storing the natural language input as a fact or query, for example in database 110.

By way of example only, if the action rule is action rule 200, and the natural language input <1> is "Peter is an engineer", then mapping step 515 reports a complete mapping, and action rule 200 is applied to natural language input <1>. The result is that data processing device 100:

- Stores the natural language input "Peter is an engineer" beneath input node <1>; and
- Output the phrase "Stored => <1>"

Therefore, when exemplary action rule 200 is executed the phrase 'Peter is an engineer' is stored, for example in database 110, beneath input node <1> and the message "Stored=> Peter is an engineer" is displayed to a user. In this way the fact that Peter is an engineer has been stored, such that it is now available as a fact to data processing device 100.

Once an action rule has been applied, data processing device 100 may return to step 500 to read further natural language input, or it may stop if it determines that all available natural language input has been processed. In the case that abstraction has been performed, data processing device 100 may return directly to step 510 and process another sub-element.

Returning to step 515, if data processing device 100 determines that the mapping is incomplete, it moves on to step 525. In step 525, data processing device 100 determines if it is possible to abstract the natural language input into sub-elements. This may include interrogating a database, such as database 110, to determine if it contains one or more abstraction rules that maps natural language input containing complex sentences and/or complex questions into a set of less complex sub-statements or sub-questions. The one or more abstraction rules may be created according to the process of FIG. 3a. Input abstraction may be performed recursively, such that a sub-element that is the result of a previous abstraction may be further abstracted in step 525.

If input abstraction is possible, data processing device 100 replaces the natural language input with the abstracted natural language input and returns to step 510 to compare the abstracted input with an action rule input pattern.

If data processing device 100 determines in step 525 that input abstraction is not possible, or that an already abstracted input cannot be abstracted further, then in some embodiments it proceeds to step 535 to request clarification from a user, as shown by a dashed arrow in FIG. 3. The manner in which user clarification is requested may be as described earlier in this specification in connection with FIGS. 3 and 3a.

In other embodiments, if data processing device 100 determines in step 525 that input abstraction is not possible, or that an already abstracted input cannot be abstracted further, then data processing device 100 proceeds to step 530 and determines if there are any further action rules available for which a mapping to the natural language input read in step 500 or abstracted natural language input produced as a result of the determination of step 525 has not been attempted. If at least one further action rule is found, data processing device returns to step 510 and proceeds with the at least one further action rule.

If data processing device determines in step 530 that there are no action rules available that it has not already made use of, then in step 535 data processing device 100 requests a clarification from a user in the manner described earlier in connection with FIGS. 2 and 2a.

Once a user clarification has been received by data processing device 100, for example via user interface 105, in step 540 data processing device 100 uses this clarification to update at least one of an abstraction rule and an action rule. In some embodiments one or more abstraction rules and/or one or more action rules may be updated by a single user clarification. The updated abstraction rule(s) and/or action rule(s) may be stored in database 110.

Following the updating of at least one rule, in the case where at least one action rule has been updated, data processing device 100 may proceed to step 520 and apply the updated action rule to the natural language input.

In the case where at least one abstraction rule has been updated, data processing device 100 may replace the natural language input with the less complex abstracted natural language input and may return to comparison step 510, where the comparison is carried out on the basis of the abstracted natural language input. The replacement may be achieved by applying the at least one updated abstraction rule. In the case that both an abstraction rule and an action rule have been updated, data processing device 100 may apply the abstraction rule to reduce the complexity of the input and then return to comparison step 510, where it may then apply the updated action rule to at least a portion of the abstracted input.

In some embodiments, step 540 may include using a user clarification to generalize one or more action rules and/or one or more abstraction rules in the manner described earlier in connection with FIGS. 4 and 4a. The one or more generalized action rules and/or abstraction rules may be saved in database 110 and at least one of these generalized action rules and/or abstraction rules may be applied in step 520 to at least a portion of the natural language input read in step 500, or at least a portion of an abstraction thereof.

It will be appreciated that embodiments described herein may be used to efficiently process natural language input containing at least one statement to generate a fact repository that is suited for question answering. It will also be appreciated that embodiments described herein may be used to process natural language input containing at least one question to generate at least one query that may be used to query a fact repository in order to generate an answer to the at least one natural language question. The natural language input may be directly input via one or more users, or it may be sourced from a corpus. The fact repository may be stored in database 110.

Three exemplary use cases are set out in the following pages in order to aid in the understanding of the present invention. It should be understood from the outset that these use cases are purely exemplary and that other, different uses are also within the scope of the present invention.

Use Case 1: Adding a Fact to a Fact Repository

In this exemplary use case, a user enters the natural language statement <3>="Jane was born on 2 Mar. 1974" via the input device 105. This natural language statement is read by data processing device 100. Data processing device 100 then proceeds to query database 110 to determine if it contains any action rules. In this exemplary use the result of the determination is negative; that is, database 110 does not contain any action rules.

Data processing device 100 then attempts to abstract the natural language sentence into multiple sub-elements. However, in this example, the abstraction attempt fails because database 110 does not contain any abstraction rules. Data processing device 100 therefore proceeds to request user clarification. In this example, the clarification process includes presenting a rules definition user interface to the user, which allows the user to define a rule for processing the phrase. The user makes use of this interface to define an action rule that maps the grammatical construct Name VerbPhrase (was born on) Date onto a date of birth table structure. This allows data processing device 100 to process the natural language statement "Jane was born on 2 Mar. 1974" and to store the result as a structured fact in a date of birth table in a fact repository. The data processing device 100 then reports to the user that the fact has been successfully stored in the fact repository.

Use Case 2: Querying a Fact Repository to Answer a Question

In this exemplary use case, it is assumed that the user has already carried out Use Case 1 above, so that the fact repository contains a structured fact relating to the natural language statement "Jane was born on 2 Mar. 1974".

In this exemplary use case, a user enters the natural language question <4>="When was Jane born?" Data processing device 100 queries database 100 and determines that it contains a single action rule, as defined in Use Case 1. Data processing device 100 determines that this action rule is not suitable for processing the question "When was Jane born?" and so it attempts to abstract this question. However, data processing device 100 determines that database 100 does not contain any abstraction rules, so the attempt to abstract user input <4> fails. Data processing device 100 therefore proceeds to request a clarification from the user.

In this example, the clarification process includes presenting a rules definition user interface to the user, which allows the user to define a rule for processing the question. The user defines an action rule that includes the construction of a query suited for querying a fact repository stored on database 100 and the specification of an output to be generated using the result set of the query. This action rule is able to process the natural language question "NAME was born on DATE".

In this example, the output specification includes definitions for no matching records, a single matching record and multiple matching records. In particular, an action rule is defined that queries a date of birth table structure. If no matches are found, an output is generated stating that no results exist. If a single match is found, an output is generated showing the result set. In this example, in the case that multiple results are found the user chooses that a result should not be generated, i.e. the same as if no matches were found.

Once the user has defined the action rule for processing this question, data processing device 100 executes this rule and returns the result to the user: "Jane born on 2 Mar. 1974".

Use Case 3: Processing a Complex Sentence
In this exemplary use case, it is assumed that the user has already carried out Use Cases 1 and 2 above, so that the fact repository contains a structured fact relating to the natural language statement "Jane was born on 2 Mar. 1974" and an action rule for processing the natural language question "NAME was born on DATE".

In this exemplary use case, a user enters the natural language statement <5>="Peter was born on the same day as Jane". Data processing device 100 queries database 100 and determines that it contains a single action rule, as defined in Use Case 1. Data processing device 100 determines that this action rule is not suitable for processing the statement "Peter was born on the same day as Jane" and so it attempts to abstract this statement. However, data processing device 100 determines that database 100 does not contain any abstraction rules, so the attempt to abstract user input <5> fails. Data processing device 100 therefore proceeds to request a clarification from the user.

In this example, the clarification process includes presenting a rules definition user interface to the user, which allows the user to define a rule for processing the input. The user creates an abstraction rule that maps user input <5> onto two statements:

---
1. "Peter was born on <DATE>"
2. <Date> = "When was Jane born?"
---

Data processing device 100 applies the abstraction rule created by the user and reduces input <5> to sub-statement 1 and sub-question 2 above. Data processing device 100 then determines that it has an action rule capable of processing sub-question 2 (this being the rule defined in Use Case 2) and so it proceeds to execute the query that results from sub-question 2. The result of this query is <DATE>=2 Mar. 1974.

The result of the earlier query <DATE>=2 Mar. 1974 is inserted into sub-statement 1, resulting in the statement "Peter was born on 2 Mar. 1974". This natural language statement is then processed by data processing device 100 using the action rule defined in Use Case 1. The resulting fact is then stored as a structured fact in the date of birth table in the fact repository and the user if informed that storage of this fact has been successful.

It will be appreciated by a person having the benefit of this disclosure that embodiments described herein represent improved systems, methods and computer program products. In particular, by using human input to define new processing rules and to adapt existing ones, embodiments allow a large database of rules that are able to handle a wide variety of natural language input to be created in a relatively short time. Processing rules may be defined across all subject areas and across all natural languages, meaning that the applicability of embodiments described herein is not limited to specific subject areas or specific natural languages. Moreover, this is achieved without requiring large amounts of computing resources, as generalized processing rules may be created quickly without requiring significant processing power. Processing rules can also be created without recourse to large volumes of training material, as may be required by some prior art systems.

Further advantages are achieved by using one or more abstraction rules. In particular, abstracting complex natural language input into sub-elements of reduced complexity, natural language input that is initially outside the scope of existing processing rules can be bought within their scope. This further extends the amount of natural language input that can be handled by a single set of processing rules.

In addition to the embodiments of the invention described in detail above, the skilled person will recognize that various features described herein can be modified and combined with additional features, to result in additional embodiments also within the scope of the claims.

The invention claimed is:
1. A computer implemented method for processing natural language input that includes both a statement and a question, comprising the steps of:
  receiving the natural language input;
  determining whether an action rule exists in a rules database for processing the natural language input and processing the natural language input if the determination is positive;
  requesting first clarification data from a user if the determination is negative;
  updating the rules database on the basis of the first clarification data, wherein in response to receiving the first clarification data, examining action rules in the rules database to determine whether a new action rule is required or whether at least one of the action rules in the rules database is to be adapted;
  determining whether at least one abstraction rule exists in the rules database for abstracting the natural language input into a plurality of sub-elements;
  responsive to determining that at least one abstraction rule does exist in the rules database for abstracting the natural language input, abstracting the received natural language input into the plurality of sub-elements using the at least one abstraction rule that comprises an input pattern and an associated action set;
  responsive to determining that at least one abstraction rule does not exist in the rules database for abstracting the natural language input, requesting second clarification data from the user;
  wherein the first and second clarification data includes at least one predetermined processing instruction and the examining step includes identifying ones of the action rules that include at least one of the same predetermined instructions as the first clarification data, wherein each of the action rules that include at least one of the same predetermined instructions as the first clarification data is evaluated to determine whether the action rule can be generalized to include fewer rule requirements when processing the natural language input;
  wherein the action rule is in a form of an input pattern that is associated with at least one action, and the step of determining whether the action rule exists in the rules database comprises determining if the natural language input contains all tokens specified in the input pattern; and wherein the plurality of sub-elements comprises a sub-statement and a sub-query, and wherein processing the natural language input further comprises:

executing the sub-query to obtain a query result that is inserted into the sub-statement;

processing the sub-statement using the action rule determined to exist in the rules database to obtain an extracted fact associated with the statement;

storing the extracted fact in the rules database;

querying the rules database using the sub-query to obtain an answer to the question; and providing the answer to the user.

2. A method according to claim 1, wherein the evaluation includes modifying the action rule and determining whether the resulting modified action rule is invoked by the natural language input.

3. A method according to claim 2, wherein the evaluation includes modifying the action rule and determining whether the resulting modified action rule is invoked by the natural language input in several iterations.

4. A method according to claim 2, wherein a determination is made that the new action rule is required when the determination on whether the resulting modified action rule is invoked by the natural language input is negative.

5. A method according to claim 1, wherein if more than one abstraction rule for abstracting the natural language input is found, selecting one of the plurality of abstraction rules, the selection based at least in part on rule complexity.

6. A data processing device, comprising a data processor coupled to a memory, for processing natural language input that includes both a statement and a question, wherein the processing device is configured to:

receive the natural language input;

determine whether an action rule exists in a rules database for processing the natural language input and process the natural language input if the determination is positive;

request first clarification data from a user if the determination is negative;

update the rules database on the basis of the first clarification data, wherein in response to receiving the first clarification data, the device is configured to examine action rules in the rules database to determine whether a new rule is required or whether at least one of the action rules in the rules database is to be adapted;

determine whether at least one abstraction rule exists in the rules database for abstracting the natural language input into a plurality of sub-elements;

responsive to determining that at least one abstraction rule does exist in the rules database for abstracting the natural language input, abstract the received natural language input into the plurality of sub-elements using the at least one abstraction rule that comprises an input pattern and an associated action set;

responsive to determining that at least one abstraction rule does not exist in the rules database for abstracting the natural language input, request second clarification data from the user;

wherein the first and second clarification data includes at least one predetermined processing instruction and the examination includes identifying ones of the action rules that include at least one of the same predetermined instructions as the first clarification data, wherein the device is adapted to evaluate each of the action rules that include at least one of the same predetermined instructions as the first clarification data to determine whether the action rule can be generalized to include fewer rule requirements when processing the natural language input;

wherein the action rule is in a form of an input pattern that is associated with at least one action, and the step of determining whether the action rule exists in the rules database comprises determining if the natural language input contains all tokens specified in the input pattern; and wherein the plurality of sub elements comprises a sub-statement and a sub-query, and wherein the processing device is further configured to:

execute the sub-query to obtain a query result that is inserted into the sub-statement;

process the sub-statement using the action rule determined to exist in the rules database to obtain an extracted fact associated with the statement;

store the extracted fact in the rules database;

query the rules database using the sub-query to obtain an answer to the question; and provide the answer to the user.

7. A device according to claim 6, wherein the evaluation includes modification of the action rule and determination of whether the resulting modified action rule is invoked by the natural language input.

8. A device according to claim 6, wherein evaluation includes modification of the action rule and determination of whether the resulting modified action rule is invoked by the natural language input in several iterations.

9. A device according to claim 7, wherein a determination is made that the new action rule is required when the determination on whether the resulting modified action rule is invoked by the natural language input is negative.

10. A device according to claim 6, wherein if more than one abstraction rule for abstracting the natural language input is found, the device is adapted to select one of the plurality of abstraction rules, the selection based at least in part on rule complexity.

* * * * *